United States Patent [19]
Sharpe

[11] 3,741,199
[45] June 26, 1973

[54] CLINICAL BLOOD PRESSURE MEASURING APPARATUS

[75] Inventor: John E. Sharpe, London, England

[73] Assignee: Wilkinson Sword Limited, London, England

[22] Filed: Sept. 29, 1971

[21] Appl. No.: 184,666

[30] Foreign Application Priority Data
Oct. 7, 1970 Great Britain............... 47,740/70

[52] U.S. Cl... 128/2.05 M, 128/2.05 A, 128/2.05 Q
[51] Int. Cl............................................. A61b 5/02
[58] Field of Search................. 128/2.05 R, 2.05 A, 128/2.05 G, 2.05 M, 2.05 Q, 2.05 C

[56] References Cited
UNITED STATES PATENTS

| 2,272,836 | 2/1942 | Gerdien | 128/2.05 M |
| 2,139,509 | 12/1938 | Marcellus | 128/2.05 Q |
| 3,118,440 | 1/1964 | Dobbeleer | 128/2.05 A |
| 2,039,000 | 4/1936 | Hesse | 128/2.05 M |
| 3,126,885 | 3/1964 | Hinman | 128/2.05 M |
| 2,149,690 | 3/1939 | Snyder | 128/2.05 M |

Primary Examiner—Aldrich F. Medbery
Attorney—Jarrett Ross Clark, Franklin M. Crouch and Gordon R. Coons

[57] ABSTRACT

A pair of inflatable cuffs, for encircling a patient's limb, are connected to a reservoir and pumped up above the systolic pressure. The reservoir and cuff pressure is allowed to leak controllably and, via a bellows arrangement, the falling pressure turns a pivotal arm whose distal end carries an electric motor. A recording pen extends radially from the motor shaft and moves along a pressure axis on a chart as the arm pivots. When the falling pressure reaches the systolic level, blood pulsations generate pneumatic pulses in the cuffs which are electrically detected by an anomometer and cause the motor shaft to oscillate, providing transverse pen movement. Such oscillations diminish when the falling pressure reaches the diastolic level.

10 Claims, 5 Drawing Figures

3,741,199

CLINICAL BLOOD PRESSURE MEASURING APPARATUS

BACKGROUND OF THE INVENTION

The invention relates to the detection and measurement of blood pressure in a cardio-vascular circulatory system.

The blood pressure in cardio-vascular cicualtory systems varies between maximum, or systolic, and minimum, or diastolic, limits, and it is a customary clinical procedure to measure the pressure at the systolic and diastolic points, that is, the systolic and diastolic pressures, by means of an auscultatory technique. In such a technique, a cuff encircling a limb of a patient is inflated manually above the systolic pressure so that the blood flow through blood vessels in the limb is occluded. This condition can be detected by a stethoscope and is signified by the absence of the auscultatory sound of the blood pulsating through the constricted blood vessel. If the cuff pressure is allowed to fall progressively, then blood flow pulsations will recommence when the diminishing cuff pressure has fallen to the systolic level since, at this value, the blood pressure is able, at the high pressure point in each cardiac cycle, to force a pulse of blood through the encircled blood vessel. The pressure at which the auscultatory sounds are first detected in read off a manometer and is the systolic pressure. The blood flow pulsations continue as the blood pressure continues to fall, but substantially reduce when the cuff pressure has diminshed to the diastolic level, and this is signified by disappearance of the auscultatory sounds. The cuff pressure when the auscultatory sounds disappear can thus be read off the manometer and is the diastolic pressure.

This technique suffers from the disadvantage that is is not automatic in nature and its accuracy depends quite considerably upon the skill and training of th operator, the criteria used for the identification of the auscultatory sounds, and the diameter and obesity of th limb carrying the cuff. The exact pressures at which the auscultatory sounds appear and disappear may be very difficult to detect, particularly in certain patients, and moreover the readings can be made unreliable by movement of the patient.

Various attempts have been made to automate the above procedure. However, each of these attempts still requires to exercise of a fair amount of skill by the operator, and/or uses comparatively complicated electronic circuitry, and/or cannot be used to provide a permanent record in a simple manner.

It is an object of the invention to provide improved apparatus for automatic clinical measurement of systolic and diastolic blood pressure.

It is a further object of the invention to provide apparatus for automatically producing a visible record from which a patient's systolic and diastolic blood pressure can be read off with the exercise of only the minimum skill and training.

BRIEF SUMMARY OF THE INVENTION

According to the invention, there is provided apparatus for automatic clinical measurement of systolic and diastolic blood pressure, comprising cuff means for encircling part of the patient where the blood pressure is to be determined, reservoir means in pressure connection with the cuff means for storing pressure in itself and in the cuff means above the systolic level, a pressure leak allowing the reservoir and cuff pressure to fall progressively, first pressure-responsive means responsive to the falling pressure in the reservoir means and the cuff means to move an output element correspondingly in a predetermined direction, and second pressure-responsive means responsive to pressure variations in the cuff means, caused by blood pulsations in the said part of the patient as the cuff pressure falls, to oscillate the output element in a different direction.

DESCRIPTION OF THE DRAWINGS

A blood pressure recorder embodying the invention will now be described, by way of example only, with reference to the accompanying drawings in which.

DESCRIPTION OF THE PREFERRED EMBODIMENT

Figure 4:
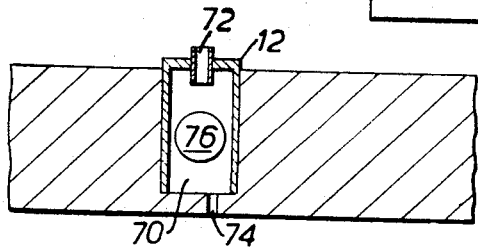
FIG. 4 is a diagrammatic cross-section of a valve used in the recorder.
Figure 5:
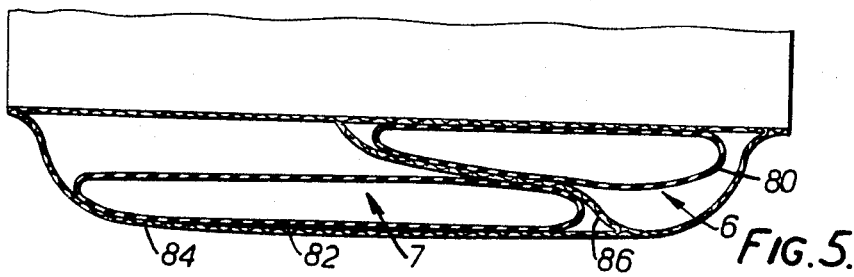
FIG. 5 is a diagrammatic cross-section through a cuff assembly used in the recorder.
Figure 3:
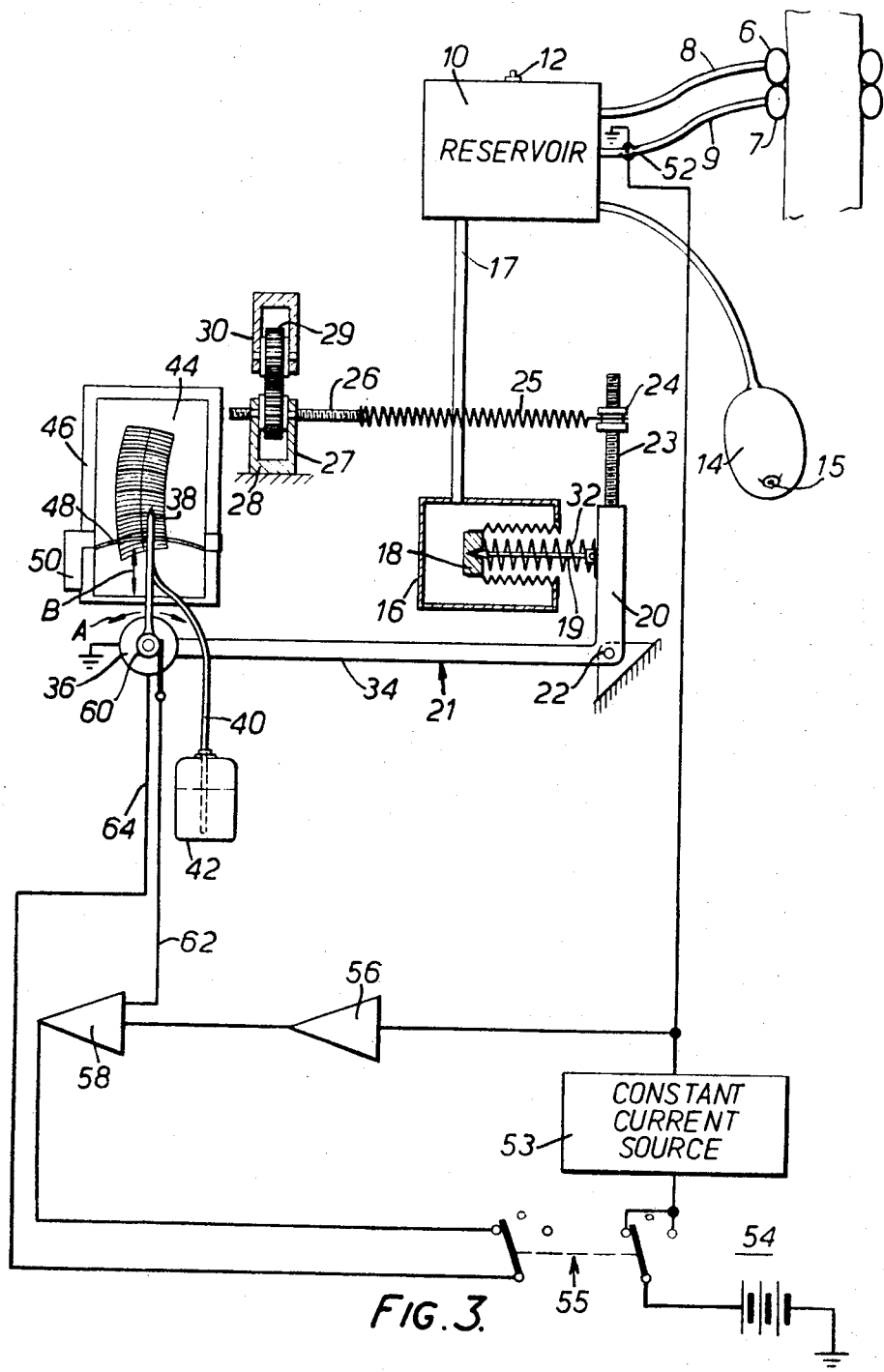
FIG. 3 is a schematic diagram of the recorder, explaining its construction and operation.

As shown in FIGS. 3 and 5, the recorder comprises cuff means in the form of a double cuff comprising two mechanically overlapping cuffs 6 and 7 which are connected by respective flexible tubes 8 and 9 to a reservoir 10. The reservoir 10 is connected to atmosphere through a constant rate pressure leak valve 12 which will be described in detail below with reference to FIG. 4. The air pressure in the reservoir 10 can be raised by means of a pump 14 in the form of a resilient bulb having a non-return inlet valve 15 therein.

As shown in FIG. 5 and described in detail hereinafter, each of the cuffs 6 and 7 is constituted by a respective rubber annular bladder, the bladders mechanically overlapping each other.

A bellows 16 is in pressure connection with the interior of the reservoir 10 via a tube 17. The bellows 16 comprises a resiliently supported member 18 which engages one end of a push rod 19. The other end of the push rod 19 is pivotally attached to a point on a short arm 20 of an L-shaped lever 21 which is pivotally supported on a fixed part on th instrument at a pivot point 22. A rigid screw 23 extends upwardly from the distal end of the short arm 20 and carries a nut 24 which can be screwed up and down the screw 23. One end of a tension spring 25 is anchored to th nut 24, and the other end thereof is rotatably attached to a threaded spindle 26. The spindle passes through and threadably engages a toothed wheel 27 which is rotatably mounted in a block 28 rigidly attached to a fixed part of the instrument. A second toothed wheel 29 engages the wheel 27 and is mounted for rotation in a rigidly mounted block 30 on a fixed part of th instrument.

A compression spring 32 is mounted on th push rod 19 and engages and urges apart the member 18 and the arm 20.

The long arm 34 of the L-shaped lever 21 supports a small d.c. motor 36 from the shaft of which radially extends a pen or stylus 38. A capillary tube 40 is attached to th pen 38 and feeds a suitably coloured (e.g., red) ink to it from a reservoir 42. The pen 38 is in contact with a chart 44 which is held in position (as by clips or the like, not shown) on a platform 46. A curved arm 48 extends across the chart, between the chart and the pen 38, and is rotatable by means of an arm 50.

The recorder includes a hot wire anemometer 52 located in the tube 9 so as to be responsive to the flow path of air between the reservoir 10 and the cuff 7. Th anemometer 52 is energised with a substantially constant electrical current developed in a source 53 which is powered by a battery 54 via a switch 55, and the voltage developed across the anemometer is monitored by an input amplifier 56 and the resultant output fed to one input of a servo amplifier 58. The second input of the servo amplifier 58 is fed from a potentiometer 60 via a lead 62, the potentiometer 60 being linked to the shaft of the motor 36 so that the signal on the line 62 represents the instantaneous angular position of th motor shaft. The servo amplifier 58 compares the signals received at its inputs and produces an output according to the difference between them which is fed by a line 64 via the switch 55 to energise the motor 36. The sense of the output of the amplfiier 58 is such that the motor is driven unti th two inputs of the amplifier 58 balance. In this way, the shaft of the motor 36, and thus the position of the pen 38, are caused to follow the voltage variations across the anemometer 52. The amplifier 58 may incorporate a phase advance network (not shown) for damping oscillations in the servo system. The leads 62 and 64 may be fed to the motor 60 along appropriate channels formed in the long arm 34 of the L-shaped lever 21.

Figure 2:
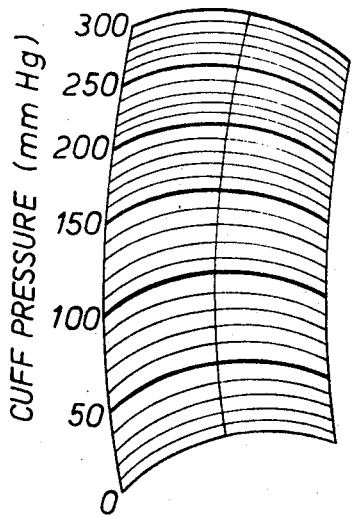
FIG. 2 is a view of a record card used in the recorder.

In operation, the lever 50 is depressed so as to rotate the curved arm 48 and to lift the pen 38 off the platform 46. A record chart of the form shown in FIG. 2 is then placed on the platform 46 and held in position. The lever 50 is then released so as to lower the pen 38 on to the chart 44. With atmospheric pressure in the reservoir 10, the pen 38 is brought to the zero pressure position on the chart 44 by rotating the tooth wheel 29. This causes axial movement of the threaded spindle 26, and this movement is transmitted via the spring 25 to cause the necessary angular movement of the L-shaped lever 21 about its pivot point 22.

The cuffs 6 and 7 are then fitted around the arm of the subject and the tubes 8 and 9 connected up to the reservoir together with the pump 14. The switch 55 is then switched to its righthand position so as to energise the constant current source and to heat up the anemometer 52. The motor 36 remains electrically isolated.

The pump 14 is then operated to raise the pressure in the reservoir 10 and thus to inflate the cuffs. As the pressure rises, the bellows 16 expand and the push rod 19 causes the L-shaped lever 21 to pivot clockwise about the pivot point 22. The pen thus moves over the chart 44 in the direction of increasing pressure, until it records the pressure above the expected systolic pressure of the subject whereupon pumping ceases and the pressure in the reservoir 10 begins to fall progressively due to the leak valve 12. At the same time, switch 55 is moved to its lefthand position to energise the motor 36, and the motor shaft takes up a position such as to hold the pen 38 steady approximately on the central line of the chart 44.

Initially, and for so long as the cuff pressure is in excess of the systolic value, the upper cuff 6 occludes the flow of blood through the blood vessel in the subject's arm. When the pressure has fallen to the systolic value, however, blood flow pulses occur in the blood vessel at the peak pressure instants in each blood pressure cycle. Each such pulse causes a corresponding pneumatic pulse to be developed in the cuffs 6 and 7 and results in an air flow pulse in the tube 9 over the anemometer 52. Each such air flow pulse alters the resistance of the anemometer and, since there is a constant current through the anemometer, the amplifier 56 detects a change in voltage across the anemometer. By means of the servo system comprising the amplifier 58 and the feedback back line 62, each deteacted voltage pulse causes resultant angular movement of the shaft of the motor 36, and the pen 38 thus makes an oscillatory movement transverse to the pressure axis on the chart 44.

These pulses, and the relevant pen movements, continue as the cuff pressure continues to diminish. When the cuff pressure has reached the diastolic point, the blood vessel in the subject's arm is no longer collapsed at any point in the cardiac cycle, and there is thus a decrease in the pulse amplitudes detected by the anemometer 52, resulting in a decrease in the amplitudes of the oscillatory movements of the pen 38.

Thus the pressure at which sudden transverse oscillations start can be read off the chart 44 and is the systolic pressure, while diminution of the transverse oscillations can be used to determine the diastolic pressure.

It will be appreciated that there may be small pen oscillations when the cuff pressure is above the systolic value, due to supramaximal or suprasystolic pulses. However, these can be easily distinguished from the much larger pulses which occur when the cuff pressure has fallen to the systolic level. It will also be appreciated that the pressure pulses actually detected by the anemometer 52 represent in fact the differential between the blood pressur and the pneumatic pressure in the reservoir 10.

If the battery has run down below the minimum permissible level, the pen 38 will move off the chart 44 when the switch 55 is moved to its lefthand position, thus warning the operator.

The nut 24 can be adjusted on the screw 23 to compensate for variations in the spring rate of the bellows 16.

The lever arm movement is proportional to pressure. The pressure is always measured as it falls at a constant rate, and therefore hysteresis and friction errors are minimised.

The recorder can produce a record to within 5 millimetres of mercury in a time getween about 30 and 60 seconds, and the complete blood pressure measuring operation need take only about ½ to 2 minutes.

It will be seen that the recorder is advantageous in that the systolic and diastolic pressures of the subject can be read directly off the chart 44, and the measurement of these points is not dependent on the skill and training of the operator. The recorder is thus advantageous over auscultatory techniques in which the appearance and disappearance of blood flow pulses is detected by means of a stethoscope: the exact pressures at which these pulses appear and disappear may be very difficult to determine, and different operators, even if experienced, may produce different results on the same subject. The recorder illustrated does not suffer from these disadvantages, and may even be sufficiently sensitive to enable measurement of the systolic and diastolic pressures on patients whose blood pressure cannot normally be measured.

It appears possible to correlate the record produced with certain heart conditions, thus enabling the recorder to be used for diagnosis.

Figure 1:
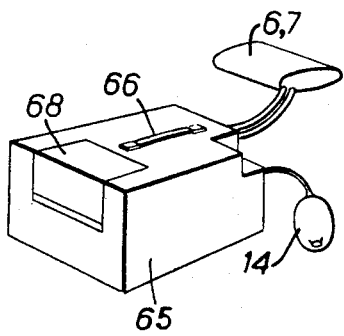
FIG. 1 is a perspective view of the recorder.

FIG. 1 shows how th various parts of the recorder are incorporated into a portable unit comprising a casing 65, to which the fixed parts of the recorder are attached, having a carrying handle 66, the cuffs 6 and 7, and the bulb or pump 14. A window 68 is provided for viewing the chart 44 therethrough, as well as a slit (not shown) for removing the chart (which thus provides a permanent record after use) and for insertion of the new chart.

In a modification, the bulb pump 14 is replaced by an electrically operated pump powered by the supply battery of the recorder.

FIG. 4 shows the leak valve 12 in cross-section. It comprises a tubular passageway 70 leadin from th inside to the outside of the reservoir 10 via holes 72 and 74, the latter being off the centre line of the passageway 70. Inside the passageway 70 is a ball 76 which is forced, against gravity, by the pressure difference into contact with the rim of th hole 72. The off-centre positioning of the hole 74 prevents the ball from completely sealing the hole 74, and thus allows the desired pressure leak to take place.

FIG. 5 shows a cross-section through the two cuffs 6 and 7. Each cuff comprises a respective rubber bladder 80, 82, which is inflatable from the reservoir via the appropriate pressure line in th manner explained. The lower cuff 7 is cloth cover 84 extends over both bladders and a cloth partition 86 extends between them.

I claim:

1. Apparatus for automatic clinical measurement of systolic and diastolic blood pressure, comrising
    cuff means for encircling part of the patient where the blood pressure is to be determined,
    reservoir means,
    a pressure connection between the reservoir means and the cuff means,
    pump means connected to the reservoir means for raising the pressure in the reservoir means and in the cuff means to above the systolic level,
    means defining a pressure leak in communication with the reservoir means for allowing the pressure in the reservoir means and cuff means to fall progressively,
    a blood pressure indicating output element,
    means mounting the output element for movement in two transverse directions,
    first pressure-responsive means having a pressure input connected to the reservoir means to sense the falling pressure in the reservoir means and the cuff means and an output at which is produced a corresponding output signal which is connected to move the output element correspondingly in one of said directions, and
    second pressure-responsive means mounted between the reservoir means and the cuff means to sense pressure variations in the cuff means caused by blood pulsations in said part of the patient as the cuff pressure falls having an output at which is developed a corresponding output signal which is connected to oscillate the output element in the other one of said directions, said output element indicating the result of said signals as readings of blood pressure.

2. Apparatus according to claim 1, in which the output element comprises a recording medium marking element, and including means for supporting a recording medium in juxtaposition with the output element for marking thereby.

3. Apparatus according to claim 1, in which the means mounting the output element comprises
    an arm movably supported on the base, and
    an electric motor rigidly attached to the arm and having an output shaft to which the output element is attached. the 4. Apparatus according to claim 3, in which one of the said pressure-responsive means develops a mechanical output and includes means connected to the arm for moving the arm in dependence on th mechanical output, and in which the other of the pressure responsive means produces an electrical output and includes means connecting the electrical output to energise the said motor.

5. Apparatus according to claim 3, in which:
    the first pressure responsive means comprises means defining a container having movable wall means and in pressure communication with the reservoir means, and means transmitting th movement of the wall means to the arm, and
    the second pressure responsive means comprises temperature-sensitive electrical resistance means mounted in the pressure connection between the cuff means and the reservoir means whereby to change its electrical resistance in response to the said blood pulsations, means operative to develop electrical signals in response to the changes in resistance, an means energising the electric motor in dependence on th electrical signals.

6. Apparatus according to claim 5, in which the cuff means comprises two separate cuffs, and in which the said pressure connection comprises respective pressure lines connecting the cuffs to the reservoir means, the temperature-sensitive variable electrical resistance means being mounted in one said pressure line.

7. Apparatus according to claim 4, in which the said means for energising the electric motor in dependence on the electrical output comprises
    means producing a feedback signal in dependence on the instantaneous position of th motor shaft, and
    a servo amplifier responsive to the said electrical output and to the feedback signal and operative to amplify the difference, if any, between them whereby to produce a power signal for the motor.

8. Apparatus according to claim 5, in which the said arm is part of a pivoted first-order lever, and in which the said electric motor is mounted adjacent one distal end of the lever with its shaft rotatable about an axis parallel to the pviotal axis of the lever, and in which the movement of the said movable wall means is applied to a point on th lever on the opposite side of the pivotal axis thereof to the electric motor.

9. Apparatus according to claim 2, incorporated in a hand-portable container.

10. Apparatus according to claim 1, in which the means defining the pressure leak comprises a valve controlling a fluid path between atmosphere and a reservoir means, the said valve comprising
    means defining a tubular passageway leading from the inside to the outside of the reservoir means, means terminating each end of the passageway in through holes of lesser cross-sectional area than the passageway, one of the holes being off the centre line along the passageway, and a ball loosely mounted in the passageway so as to be forced by the pressure in the reservoir means to sit only partially over the entrance to the hole leading to the outside of the reservoir means.

* * * * *